Dec. 16, 1924.
W. H. NOELTING
1,519,794
CASTER AND ANGLE IRON MOUNTING BRACKET
Filed Aug. 6, 1923
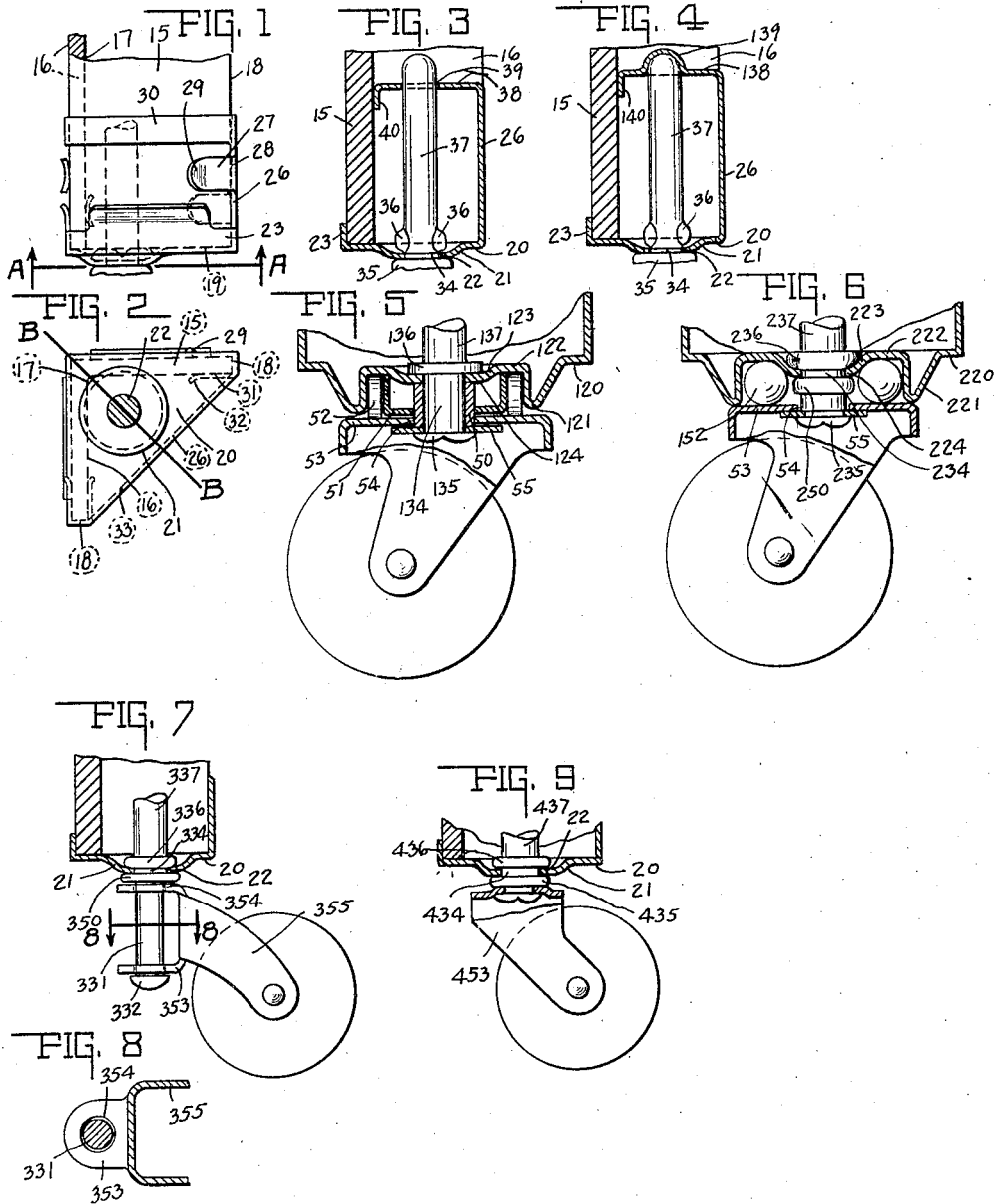
INVENTOR.
WILLIAM H. NOELTING.
BY
*[signature]*
ATTORNEYS.

Patented Dec. 16, 1924.

1,519,794

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

CASTER AND ANGLE-IRON MOUNTING BRACKET.

Application filed August 6, 1923. Serial No. 655,979.

*To all whom it may concern:*

Be it known that I, WILLIAM H. NOELTING, a citizen of the United States, and a resident of Evansville, county of Vanderburg, and State of Indiana, have invented a certain new and useful Caster and Angle-Iron Mounting Bracket; and I do hereby declare that the following is a full, clear, and exact description thereof, reference being had to the accompanying drawings, in which like numerals refer to like parts.

This invention relates to a bracket mounting for multi-sided non-tubular legs.

The chief object of this invention is to provide a unitary bracket mounting which detachably but rigidly supports a caster construction upon a leg of the character described, by clampingly engaging said leg.

The several features of the invention may be succinctly stated as follows: The construction of a bracket for clampingly engaging a leg of the character described, which bracket is provided with a base that is associated with several caster forming parts to rigidly support the same.

Another feature of the invention consists in rigidly securing the caster stem or pintle, whether of the short or long variety, to said bracket; and a further feature of the invention consists in extending the stem or pintle and forming a portion of the bracket so that it will engage said extension and limit the tilting movement thereof.

Another feature of the invention consists in forming the base of the bracket in such a manner that a portion of it serves to form a raceway for an anti-friction bearing.

The full nature of the invention will be understood from the accompanying drawings and the following description and claims:

In the drawings Fig. 1 is a side elevational view of an end of a multi-sided non-tubular leg of the angle iron type and the unitary bracket mounting positioned thereon. Fig. 2 is a sectional view taken on the line A—A of Fig. 1 and in the direction of the arrows. Fig. 3 is a transverse sectional view taken on the line B—B of Fig. 2 and of one form of the unitary bracket and caster. Fig. 4 is a view similar to Fig. 3 and is taken in the same plane and is of a modified form of the invention. Fig. 5 is a transverse sectional view of a modified form of base which forms a raceway for an anti-friction bearing caster construction of the roller type. Fig. 6 is a view similar to Fig. 5 of a similar but modified construction and of the ball type. Fig. 7 is a view taken on line B—B of Fig. 2 and of a modified form of the invention. Fig. 8 is a transverse sectional view taken on line 8—8 of Fig. 7. Fig. 9 is a transverse sectional view of a plain caster construction and is likewise taken on line B—B of Fig. 2.

In the drawings there is illustrated a multi-sided non-tubular leg which herein is illustrated as of angle formation, although the same is not necessarily restricted thereto. The leg is illustrated as having the sides 15 and 16 joined at 17 and provided with the side edges 18 and the bottom edge 19. The combination bracket and caster is herein illustrated in Figs. 1 and 2 as formed of a base 20 which supports a cup-shaped reenforcing annular portion 21, the latter being provided with a central aperture 22. In said Figures 1 and 2 the base 20 supports a cup-forming portion 23, which cup-forming portion is provided with upwardly extending flanges 24 which are turned outwardly or lipped at 25 to permit the ready reception of the leg by the same. The base 20 also supports the back 26, which back is provided at opposite sides with a pair of lateral clamping projections 27 inclined as at 28 to form a wedging construction. The free ends of the clamping constructions 27 are turned outwardly as shown dotted at 29 to permit of the ready reception of the leg and to increase the clamping action thereof. Also supported by the back 26 is a band 30 which is adapted to encircle the leg construction with said back. There is also provided, and herein the same is shown formed from the back 26, a pair of clamping members 31 having turned free ends 32. These clamping members are formed by striking from the back, as at 33, said projecting portions. If desired, the same may be struck from a portion of the base where the base is otherwise not utilized, which modification is preferably in certain combinations.

It is to be understood from the foregoing that the mounting may be varied as desired to include any one of the foregoing types of clamping constructions, or any combination thereof; the chief feature, however, being the clamping action of the unitary and preferably integral bracket formed from a single piece of sheet metal.

Reference will now be had to Fig. 3, and in this form of the invention the parts of the bracket mounting are similarly indicated, but in said figure there is illustrated a caster stem or pintle having a portion 34 which is seatable in the base aperture 22, and upon opposite sides of said apertured base suitable enlargements are provided, such as the flange 35 and the enlargements 36. The stem 34 may be extended as at 37 and terminate slightly above the top of the bracket mounting. The back 26 of the bracket is herein shown provided with a forwardly extending tongue 38 which is apertured at 39 to receive the stem extension and center the same, thereby preventing tilting movement of said stem in the bracket. If desired, the forward extension 38 is continued and is turned angularly thereof, and herein downwardly, to form a tongue 40 for clamping purposes. However, the tongue may be omitted, but the addition thereof serves to increase the rigidity of the construction when mounted upon the end of the leg.

In Fig. 4 there is illustrated a modified form of the invention, and herein the stem 34 is provided with the extension 37 previously described; and the head of said stem, instead of passing through the forward extension, in this instance is seated in a cup or socket 139 formed in the forward extension 138, which extension similar to the extension 38 lies parallel to the base 20 and is supported by the back 26. If desired, the forward extension 138 may be extended and a tongue portion 140 is provided which herein is likewise shown depending and is similar to that shown in Fig. 3.

In Figs. 5 and 6 an additional feature of the invention is illustrated, and said feature consists in so forming the base that it will constitute a portion of an anti-friction caster construction.

In Fig. 4 the base 120 is provided with an inverted annular V-shaped portion 121 having an inner cylindrical wall, which V-shaped portion terminates in an annular portion 122 that is dished at 123 and provided with a central aperture 124 adapted to receive a stem or pintle 34 provided with the upper enlargement 136 herein shown in the form of a flange. If desired, said pintle or stem may be extended as at 137, and said extension may be supported as previously described with relation to Figs. 3 or 4 so as to prevent any tilting movement should the same occur. Concentric with the pintle 134 is a bushing which may or may not be split, and said bushing is herein indicated by the numeral 50. Concentric with the bushing is a cup 51 which forms the inner wall of the raceway adapted to receive the rollers 52. The rollers 52 bear upon the plate portion 53 of the yoke, and said plate portion is apertured as at 54 to receive the sleeve and the pintle. A washer 55 is positioned upon the opposite side of the plate 53 and is retained in position and simultaneously retains the entire construction in assembled relation by the pintle 134 being enlarged, as at 135.

In Fig. 6 a similar type of construction is illustrated and similar parts are similarly numbered. The base 220 is provided with an inverted V-shaped annular portion 221 which includes the annular track portion 222, the dished central portion 223 apertured at 224 to receive the stem or pintle 234 which is enlarged at 236 and may be extended, as at 237, if desired. A similar enlargement 250 retains the pintle on the base. A caster yoke including the track portion 53 is apertured at 54 and is retained upon the stem 234 by the washer 255 and the enlarged portion 235, as shown. Within the raceway thus formed, there is positioned a plurality of anti-friction members 152 of the ball type. It will, of course, be understood that the extension 237 may be supported or retained in position in any suitable manner, such as illustrated and described with reference to Figs. 3 or 4.

In Figs. 7 and 8 a modified form of the invention is illustrated, and in this form of the invention the base 20 is provided with the dished portion 21 centrally apertured as at 22, and the pintle 334 is provided with the usual upper enlargement 336, the stem extension 337, if desired, and the retaining enlargement 350 being similar to the enlargement 250 previously described. The stem, however, in this instance is extended downwardly, as at 33, and is enlarged at 332 upon its lower end. Upon said lower extension 331 is mounted a U-shaped integral member, one branch of which is parallel to the other, the same being apertured as at 354 to receive said elongated pintle. The intermediate portion of said U-shaped member has two wings 355 which constitute the ears of the caster horn.

In Fig. 9 the simplest form of caster construction is illustrated, and in this form the base 20 is provided with a centrally dished portion 21 centrally apertured as at 22. The stem or pintle 434 is enlarged as at 435 and at 436 to rigidly secure the stem to the base. The stem may be extended as at 437 if desired, and said extension may be supported or retained in any desired or preferred manner. The caster yoke indicated generally by the numeral 453 is retained upon the caster stem in any desired or preferred manner.

While in all of the figures the base is illustrated as provided with an annular reenforcing portion, it is to be understood that the base may be made flat if so desired. In addition to reenforcing the base, said annular depressed portion thereof is adapted to form a seat to receive the upper enlargement of the stem or pintle, and this is particularly desirable when the short pintle is used, the result being a neat construction.

While the invention has been described in great detail in the foregoing specifications and illustrated with equal details in the drawings, the same is to be considered as illustrative and not restrictive in character; and the various modifications herein illustrated and described as well as those suggested and those which will readily suggest themselves to those skilled in the art are all considered to be within the broad purview of this invention, as outlined by the appended claims.

The invention claimed is:

1. A unitary anti-friction caster and bracket mounting for multi-sided non-tubular legs comprising a bracket portion for clampingly engaging said leg to yieldingly retain the same thereon, a base integral with the bracket portion, an anti-friction trackway supported by the base, and anti-friction means therein.

2. A unitary anti-friction caster and bracket mounting for multi-sided non-tubular legs comprising a bracket portion for clampingly engaging said leg to yieldingly retain the same thereon, a base integral with the bracket portion, an anti-friction trackway integral with said base, and anti-friction means therein.

3. A unitary anti-friction caster and bracket mounting for multi-sided non-tubular legs comprising a bracket portion for clampingly engaging said leg to yieldingly retain the same thereon, an apertured base integral with the bracket portion, an annular portion surrounding said base aperture and reenforcing said base, an anti-friction trackway supported by said base, a caster including a pintle permanently secured in said base aperture, and anti-friction means in said trackway.

4. A unitary anti-friction caster and bracket mounting for multi-sided non-tubular legs comprising a bracket portion for clampingly engaging said leg to yieldingly retain the same thereon, an apertured base integral with the bracket portion, an annular portion surrounding said base aperture and reenforcing said base, an anti-friction trackway integral with said base, a caster including a pintle permanently secured in said base aperture, and anti-friction means in said trackway.

5. A unitary anti-friction caster and bracket mounting for multi-sided non-tubular legs comprising a bracket portion for clampingly engaging said leg to yieldingly retain the same thereon, a back integral therewith, an apertured base also integral therewith, a caster including an elongated pintle extending through the base aperture and permanently secured to the mounting, a portion also integral therewith and extending substantially parallel to said base and above the same and adapted to receive the elongated pintle to center the same, an anti-friction trackway integral with said base, and anti-friction means therein.

6. A unitary anti-friction caster and bracket mounting for multi-sided non-tubular legs comprising a bracket portion for clampingly engaging said leg to yieldingly retain the same thereon, a back integral therewith, an apertured base also integral therewith, a caster including an elongated pintle extending through the base aperture and permanently secured to the mounting, an apertured portion also integral therewith and extending substantially parallel to said base and above the same and adapted to receive the elongated pintle which extends therethrough for centering purposes, an anti-friction trackway integral with said base, and anti-friction means therein.

7. A unitary anti-friction caster and bracket mounting for multi-sided non-tubular legs comprising a bracket portion for clampingly engaging said leg to yieldingly retain the same thereon, a back integral therewith, an apertured base also integral therewith, a caster including an elongated pintle extending through the base aperture and permanently secured to the mounting, a portion also integral therewith and extending substantially parallel to said base and above the same and adapted to receive the elongated pintle to center the same, said parallel centering portion having an angular portion extending forwardly for yielding engagement with the leg, an anti-friction trackway integral with said base, and anti-friction means therein.

8. A unitary anti-friction caster and bracket mounting for multi-sided non-tubular legs comprising a bracket portion for clampingly engaging said leg to yieldingly retain the same thereon, a back integral therewith an apertured base also integral therewith, a caster including an elongated pintle extending through the base aperture and permanently secured to the mounting, an apertured portion also integral therewith and extending substantially parallel to said base and above the same and adapted to receive the elongated pintle which extends therethrough for centering purposes, said parallel centering portion extending forwardly for yielding engagement with the leg, an anti-friction trackway integral with said base, and anti-friction means therein.

9. A unitary anti-friction caster and bracket mounting for multi-sided non-tubular legs comprising a bracket portion for clampingly engaging said leg to yieldingly retain the same thereon, a back integral therewith, an apertured base also integral therewith, a caster including an elongated pintle extending through the base aperture and permanently secured to the mounting, a portion also integral therewith and extending substantially parallel to said base and above the same and adapted to receive the elongated pintle to center the same, an anti-friction trackway integral with said base, anti-friction means therein, and an annular portion surrounding said base aperture and integral with said base for reinforcing the same.

10. A unitary anti-friction caster and bracket mounting for multi-sided non-tubular legs comprising a bracket portion for clampingly engaging said leg to yieldingly retain the same thereon, a back integral therewith, an apertured base also integral therewith, a caster including an elongated pintle extending through the base aperture and permanently secured to the mounting, an apertured portion also integral therewith and extending substantially parallel to said base and above the same and adapted to receive the elongated pintle which extends therethrough for centering purposes, an anti-friction trackway integral with said base, anti-friction means therein, and an annular portion surrounding said base aperture and integral with said base for re-enforcing the same.

11. A unitary anti-friction caster and bracket mounting for multi-sided non-tubular legs comprising a bracket portion for clampingly engaging said leg to yieldingly retain the same thereon, a back integral therewith, an apertured base also integral therewith, a caster including an elongated pintle extending through the base aperture and permanently secured to the mounting, a portion also integral therewith and extending substantially parallel to said base and above the same and adapted to receive the elongated pintle to center the same, said parallel centering portion having an angular portion extending forwardly for yielding engagement with the leg, an anti-friction trackway integral with said base, anti-friction means therein, and an annular portion surrounding said base and integral with said base for reenforcing the same.

12. A unitary anti-friction caster and bracket mounting for multi-sided non-tubular legs comprising a bracket portion for clampingly engaging said leg to yieldingly retain the same thereon, a back integral therewith, an apertured base also integral therewith, a caster including an elongated pintle extending through the base aperture and permanently secured to the mounting, an apertured portion also integral therewith and extending substantially parallel to said base and above the same and adapted to receive the elongated pintle which extends therethrough for centering purposes, said parallel centering portion extending forwardly for yielding engagement with the leg, an anti-friction trackway integral with said base, anti-friction means therein, and an annular portion surrounding said base and integral with said base for reenforcing the same.

In witness whereof, I have hereunto affixed my signature.

WILLIAM H. NOELTING.